(12) United States Patent
Yang et al.

(10) Patent No.: US 12,197,063 B2
(45) Date of Patent: Jan. 14, 2025

(54) DISPLAY MODULE

(71) Applicant: TCL CHINA STAR OPTOELECTRONICS TECHNOLOGY CO., LTD., Guangdong (CN)

(72) Inventors: Weiheng Yang, Guangdong (CN); Hong Yang, Guangdong (CN); Zhichao Liao, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/758,209

(22) PCT Filed: May 13, 2022

(86) PCT No.: PCT/CN2022/092649
§ 371 (c)(1),
(2) Date: Nov. 2, 2023

(87) PCT Pub. No.: WO2023/206613
PCT Pub. Date: Nov. 2, 2023

(65) Prior Publication Data
US 2024/0219765 A1 Jul. 4, 2024

(30) Foreign Application Priority Data

Apr. 28, 2022 (CN) .......................... 202210470305.3

(51) Int. Cl.
*G02F 1/1335* (2006.01)
(52) U.S. Cl.
CPC .. *G02F 1/133512* (2013.01); *G02F 1/133502* (2013.01); *G02F 1/133504* (2013.01)

(58) Field of Classification Search
None
See application file for complete search history.

(56) References Cited

U.S. PATENT DOCUMENTS

| | | | |
|---|---|---|---|
| 2020/0117042 A1* | 4/2020 | Park | G02F 1/13725 |
| 2023/0097698 A1* | 3/2023 | Leng | H10K 50/86 |
| | | | 257/40 |

FOREIGN PATENT DOCUMENTS

| | | |
|---|---|---|
| CN | 2004300210 A | 10/2004 |
| CN | 102257426 A | 11/2011 |

(Continued)

OTHER PUBLICATIONS

Chinese Office Action issued in corresponding Chinese Patent Application No. 202210470305.3 dated May 12, 2023, pp. 1-10.

(Continued)

*Primary Examiner* — Shan Liu
(74) *Attorney, Agent, or Firm* — PV IP PC; Wei Te Chung (57) ABSTRACT

A display module is provided. The display module includes a display panel and a first light-blocking layer. The display panel includes a plurality of pixels disposed at intervals. The first light-blocking layer is disposed on a light exit side of the display panel, and the first light-blocking layer includes a plurality of light-filtering units disposed at intervals and reflected light-reducing layers each of which disposed between the corresponding light-filtering units which are adjacent to each other. The light-filtering units are respectively disposed corresponding to the plurality of pixels. The display module can achieve an anti-glare effect, and have better quality of displayed pictures.

20 Claims, 6 Drawing Sheets

(56) References Cited

FOREIGN PATENT DOCUMENTS

| CN | 103630953 | A |   | 3/2014  |        |           |
|----|-----------|---|---|---------|--------|-----------|
| CN | 104865740 | A |   | 8/2015  |        |           |
| CN | 110456572 | A |   | 11/2019 |        |           |
| CN | 110473984 | A |   | 11/2019 |        |           |
| CN | 111045243 | A |   | 4/2020  |        |           |
| CN | 112750862 | A |   | 5/2021  |        |           |
| CN | 113193008 | A | * | 7/2021  | ......... | H01L 27/3246 |
| CN | 113253528 | A |   | 8/2021  |        |           |
| CN | 113703075 | A |   | 11/2021 |        |           |
| CN | 114384623 | A | * | 4/2022  |        |           |
| JP | H0743519  | A |   | 2/1995  |        |           |
| JP | H07239411 | A |   | 9/1995  |        |           |

OTHER PUBLICATIONS

International Search Report in International application No. PCT/CN2022/092649,mailed on Dec. 15, 2022.
Written Opinion of the International Search Authority in International application No. PCT/CN2022/092649,mailed on Dec. 15, 2022.

* cited by examiner

DISPLAY MODULE

CROSS-REFERENCE TO RELATED APPLICATIONS

This application is a U.S. national phase application of a PCT Application No. PCT/CN2022/092649 filed on May 13, 2022, which claims priority to a Chinese Patent Application No. 202210470305.3 filed on Apr. 28, 2022, the disclosures of which are incorporated in their entirety by reference herein.

FIELD OF DISCLOSURE

The present disclosure relates to a field of displays, and more particularly to a display module.

BACKGROUND OF DISCLOSURE

With rapid development in liquid crystal display technology, liquid crystal displays have been widely used in electronic devices such as mobile phones, computers, and televisions, and have become mainstream products in a field of displays.

SUMMARY OF DISCLOSURE

Technical problems are as follows. However, a phenomenon of "glare" generally exists in an application process of a liquid crystal display. That is, a situation that the liquid crystal display is illuminated by external ambient light causes specular reflection of the liquid crystal display, resulting in a feeling of strong reflected light for human eyes and a "glare" reaction.

Technical solutions are as follows. Embodiments of the present disclosure provide display modules that can achieve an anti-glare effect, and have better quality of displayed pictures.

Embodiments of the present disclosure provides a display module including:
 a display panel including a plurality of pixels disposed at intervals; and
 a first light-blocking layer disposed on a light exit side of the display panel, wherein the first light-blocking layer includes a plurality of light-filtering units disposed at intervals and reflected light-reducing layers each of which disposed between the corresponding light-filtering units which are adjacent to each other, wherein the light-filtering units are respectively disposed corresponding to the plurality of pixels, wherein each reflected light-reducing layer includes a first refraction layer and a second refraction layer that are arranged in a stacking manner, and wherein a refractive index of the first refraction layer is not equal to a refractive index of the second refraction layer.

In some embodiments, the first refraction layer and the second refraction layer are sequentially stacked in a light emission direction of the display panel. The refractive index of the first refraction layer is greater than the refractive index of the second refraction layer.

In some embodiments, the refractive index of the first refraction layer is 1.6-1.65, and the refractive index of the second refraction layer is 1.3-1.4.

Thickness of the first refraction layer is 3 μm-5 μm and thickness of the second refraction layer is 90 nm-110 nm.

In some embodiments, the second refraction layer includes a first matrix and first matting particles dispersed in the first matrix. The first refraction layer includes a second matrix and second matting particles dispersed in the second matrix. A refractive index of the first matting particles is less than a refractive index of the second matting particles.

In some embodiments, the first matting particles include one or both of the following: silica sol particles and silica particles. Each silica sol particle has particle size of 10 nm-60 nm. Each silica particle has particle size of 40 nm-70 nm.

In some embodiments, the silica particles include hollow silica particles. Each hollow silica particle has a hollow structure inside itself. Volume of the hollow structure accounts for 30%-60% of total volume of each hollow silica particle.

In some embodiments, the second matting particles include metal oxide particles. Each metal oxide particle has particle size of 10 nm-50 nm.

In some embodiments, a refractive index of metal oxide particles is 1.9-2.3.

In some embodiments, material of the metal oxide particles includes one or more of the following: zinc oxide, titanium oxide, tin oxide, and indium tin oxide.

In some embodiments, the display module further includes a second light-blocking layer. The second light-blocking layer is disposed between the display panel and the first light-blocking layer. The second light-blocking layer includes one or both of the following: liquid crystal material and dichroic material.

In some embodiments, the display module further includes a roughened layer. The roughened layer is disposed between the second light-blocking layer and the first light-blocking layer. A surface of the roughened layer on a side of the roughened layer facing the first light-blocking layer is an uneven rough surface.

In some embodiments, the display module further includes a diffusion layer. The diffusion layer is disposed between the first light-blocking layer and the display panel.

The diffusion layer includes a substrate and a prism layer sequentially stacked in the light emission direction of the display panel.

In some embodiments, the prism layer includes a plurality of prism bars arranged at intervals in sequence. Each prism bar has a top edge and two bottom edges. The two bottom edges are connected with the substrate and the top edge protrudes from the substrate.

Base length L of each prism bar is distance between two bottom edges of each prism bar. Spacing P between adjacent two of the prism bars is distance between the top edges of the adjacent two of the prism bars, respectively.

Every at least one prism bar arranged in sequence is taken as a prism group. The base length L of each prism bar included in each prism group is same, the spacing P between any adjacent two of the prism bars in each prism group is same, and L/P values of any adjacent two of the prism groups are different.

In some embodiments. L/P values respectively of all of the prism groups in the prism layer are different.

In some embodiments, a color of the light passing through each light-filtering unit is consistent with a color of a correspondingly disposed pixel.

Advantageous effects are as follows. In the display module provided by the embodiments of the present disclosure, the first light-blocking layer is disposed on the light exit side of the display panel. When ambient light passes through the light-filtering units, most of the light is filtered out by the light-filtering units, thereby reducing reflected light and achieving an anti-glare effect. In addition, in the embodiments of the present disclosure, each reflected light-reducing layer is disposed between the corresponding light-filtering units which are adjacent to each other. Thus, reflected light output is further reduced and an anti-glare effect is achieved.

DESCRIPTION OF DRAWINGS

In order to describe a technical solution in embodiments more clearly, drawings required to be used by the embodiments are briefly introduced below. Obviously, the drawings in the description below are only some embodiments of the present disclosure. With respect to persons skilled in the art, under a premise that inventive efforts are not made, other drawings can be obtained based on these drawings.

DETAILED DESCRIPTION OF PREFERRED EMBODIMENTS

Technical solutions in the embodiments of the present disclosure are clearly and completely described below in conjunction with the drawings in the embodiments of the present disclosure. Obviously, the described embodiments are only a portion of the embodiments of the present disclosure, not all of the embodiments. Based on the embodiments of the present disclosure, other embodiments obtained under a premise that inventive efforts are not made by persons skilled in the art are within the protection scope of the present disclosure.

Figure 1:
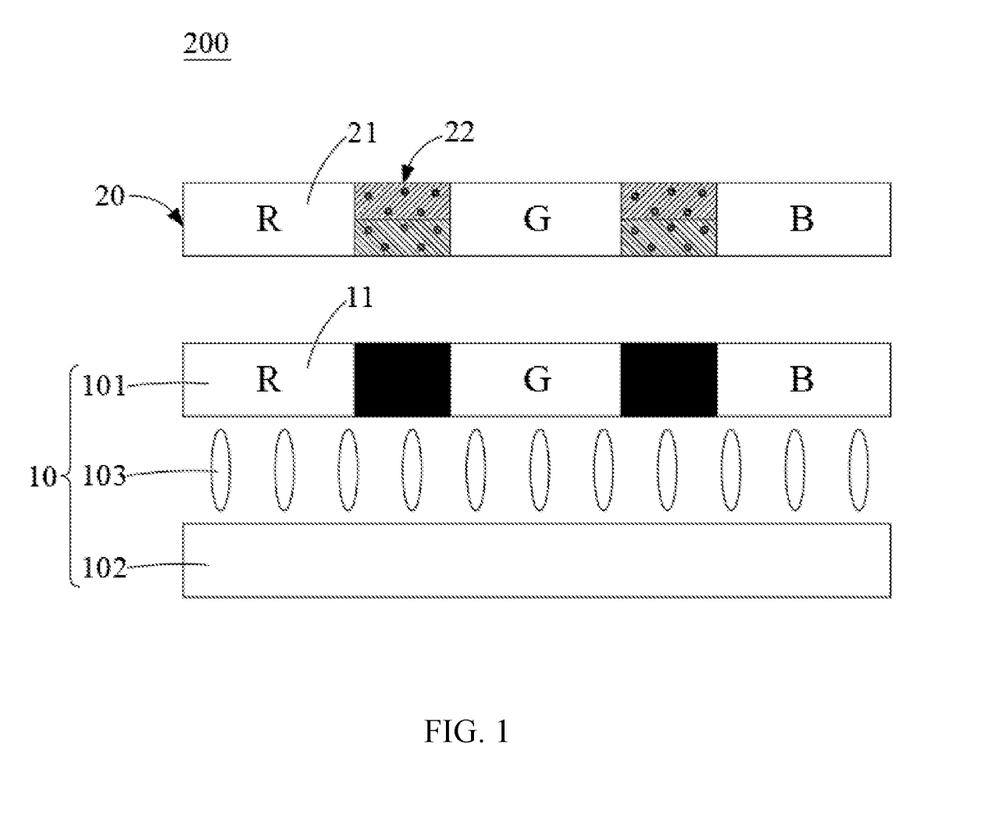
FIG. 1 is a schematic structural diagram of a first type of display module provided by embodiments of the present disclosure.

Referring to FIG. 1, FIG. 1 is a schematic structural diagram of a first type of display module provided by embodiments of the present disclosure. The embodiments of the present disclosure provides a display module 200 including a display panel 10 and a first light-blocking layer 20. The display panel 10 includes a plurality of pixels 11 disposed at intervals.

The first light-blocking layer 20 is disposed on a light exit side of the display panel 10, and the first light-blocking layer 20 includes a plurality of light-filtering units 21 disposed at intervals and reflected light-reducing layers 22 each of which disposed between the corresponding light-filtering units 21 which are adjacent to each other. The light-filtering units 21 are respectively disposed corresponding to the plurality of pixels 11. Each reflected light-reducing layer 22 includes a first refraction layer 202 and a second refraction layer 201 that are arranged in a stacking manner. A refractive index of the first refraction layer 202 is greater than a refractive index of the second refraction layer 201.

Exemplarily, the display panel 10 can be a liquid crystal display panel, an LED (light-emitting diode) display panel, or an OLED (organic light-emitting diode) display panel.

Referring to FIG. 1, the first refraction layer 202 and the second refraction layer 201 are sequentially stacked in a light emission direction of the display panel 10. The refractive index of the first refraction layer 202 is greater than the refractive index of the second refraction layer 201.

It can be understood that the meaning of the reflected light-reducing layer 22 is a structural layer that can reduce reflected light. The reflected light-reducing layer 22 includes the first refraction layer 202 and the second refraction layer 201 arranged in the stacking manner. Thus, when ambient light is incident on the reflected light-reducing layer 22, first reflected light is generated at an interface between the second refraction layer 201 and air, and second reflected light is generated at an interface between the first refraction layer 202 and the second refraction layer 201. After the second reflected light exits from the second refraction layer 201, the second reflected light has an optical interference cancellation effect with the first reflected light, thereby reducing reflected light output and achieving an anti-glare effect.

In the display module 200 provided by the embodiments of the present disclosure, the first light-blocking layer 20 is disposed on a light exit side of the display panel 10. When ambient light passes through the light-filtering units 21, most of the light is filtered out by the light-filtering units 21, thereby reducing reflected light and achieving an anti-glare effect. In addition, in the embodiments of the present disclosure, each reflected light-reducing layer 22 is disposed between the corresponding light-filtering units 21 which are adjacent to each other. Each reflected light-reducing layer 22 includes the first refraction layer and the second refraction layer sequentially stacked in the light emission direction of the display panel 10. Thus, when ambient light is incident on any reflected light-reducing layer 22, first reflected light is generated at an interface between the second refraction layer 201 and air, and second reflected light is generated at an interface between the first refraction layer 202 and the second refraction layer 201. After the second reflected light exits from the second refraction layer 201, the second reflected light has an optical interference cancellation effect with the first reflected light, thereby reducing reflected light output and achieving an anti-glare effect.

Referring to FIG. 1, a color of the light passing through each light-filtering unit 21 can be consistent with a color of a correspondingly disposed pixel 11.

Exemplarily, the pixels 11 in the display panel 10 can include a red pixel, a green pixel, a blue pixel, etc. The light-filtering units 21 in the first light-blocking layer 20 can include a red light-filtering unit, a green light-filtering unit, a blue light-filtering unit, etc. The red pixel 11 corresponds to the red light-filtering unit. The green pixel 11 corresponds to the green light-filtering unit. The blue pixel 11 corresponds to the blue light-filtering unit.

Exemplarily, material of the light-filtering units 21 can all be color resists. That is, material of the red light-filtering unit 21 is a red color resist. Material of the green light-filtering unit 21 is a green color resist. Material of the blue light-filtering unit 21 is a blue color resist.

It should be noted that because the light-filtering units 21 of the first light-blocking layer 20 are respectively disposed corresponding to the pixels 11 of the display panel 10, and the color of the light passing through each light-filtering unit 21 is consistent with the color of the correspondingly disposed pixel 11. Thus, when the ambient light passes through the first light-blocking layer 20 and enters the display panel 10, the color of the light passing through one of the light-filtering units 21 is consistent with the color of the corresponding pixel 11 in the display panel 10. Because the ambient light passing through the light-filtering unit 21 has become monochromatic light, after the monochromatic light is reflected by the display panel 10, the reflected monochromatic light can only exit from the light-filtering unit 21 of the same color, and cannot exit from the light-filtering units 21 of other colors. Thus, a problem that the reflected light of the ambient light is blended with red, green and blue monochromatic light emitted by the display panel 10 can be avoided, and quality of displayed pictures can be improved.

A situation that a traditional liquid crystal display module is illuminated by external ambient light not only causes specular reflection of the liquid crystal display, resulting in a feeling of strong reflected light for human eyes and a "glare" reaction, but also causes the reflected light to be blended with red, green and blue monochromatic light emitted by the liquid crystal display, leading to color shifts, and thus, directly affecting quality of displayed pictures. In the display module 200 provided by the embodiments of the present disclosure, each light-filtering unit 21 is disposed in the first light-blocking layer 20 and the color of the light passing through each light-filtering unit 21 is consistent with the color of the corresponding pixel 11, solving the problem that the reflected light is blended with the red, green and blue monochromatic light emitted by the display panel 10, and thus, improving the quality of the displayed pictures.

Figure 2:
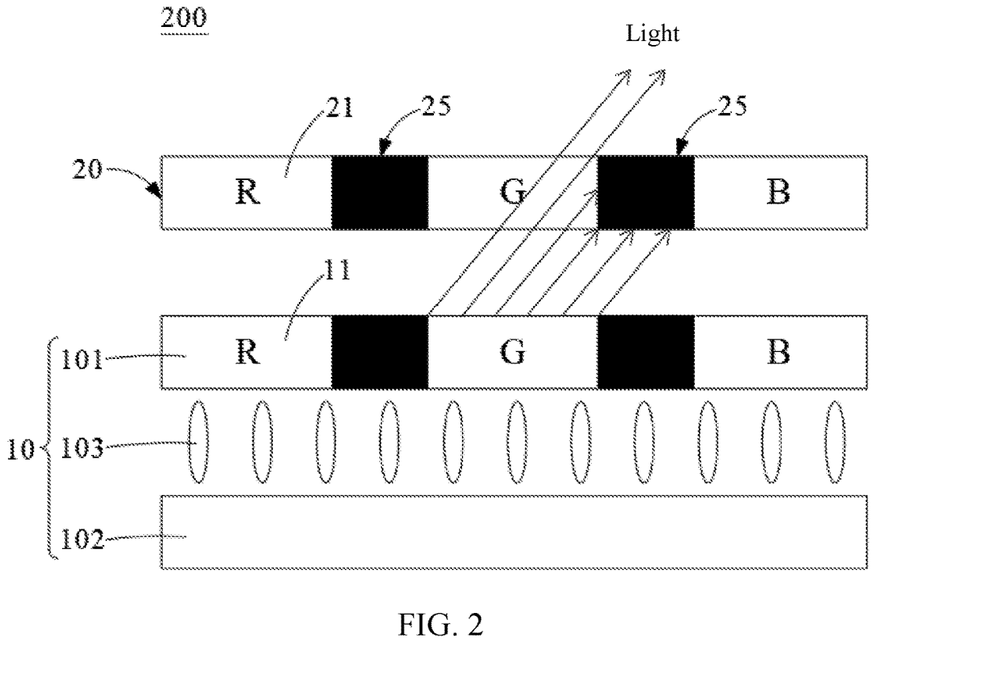
FIG. 2 is a schematic light propagation diagram of a black light-blocking layer disposed between corresponding light-filtering units which are adjacent to each other.
Figure 3:
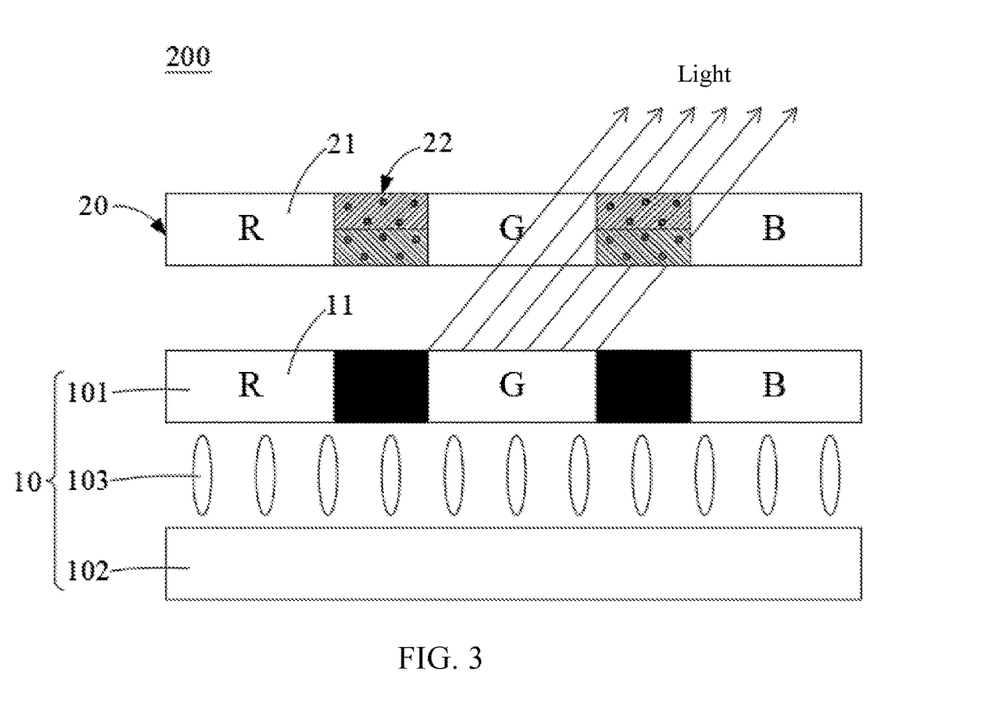
FIG. 3 is a schematic light propagation diagram of a reflected light-reducing layer disposed between the corresponding light-filtering units which are adjacent to each other.

Referring to FIGS. 2 and 3, FIG. 2 is a schematic light propagation diagram of a black light-blocking layer disposed between corresponding light-filtering units which are adjacent to each other. FIG. 3 is a schematic light propagation diagram of a reflected light-reducing layer disposed between the corresponding light-filtering units which are adjacent to each other. The following should be noted. Compared to the technical solution in which each black light-blocking layer 25 is disposed between the corresponding light-filtering units 21 which are adjacent to each other, the embodiments of the present disclosure in which each reflected light-reducing layer 22 is disposed between the corresponding light-filtering units 21 which are adjacent to each other can expand a viewing angle of the display module 200. As illustrated in FIG. 2, when each black light-blocking layer is disposed between the corresponding light-filtering units 21 which are adjacent to each other, light emitted from a pixel 11 and at an oblique angle is blocked by each black light-blocking layer 25. Thus, when a user views the display module 200 with an oblique-viewing angle, because an output amount of light exited at an oblique angle is less, quality of pictures seen by human eyes is lower, and thus, a viewing angle of the display module 200 is smaller. As illustrated in FIG. 3, the technical solution in which each reflected light-reducing layer 22 is disposed between the corresponding light-filtering units 21 which are adjacent to each other is provided by the embodiments of the present disclosure. Because each reflected light-reducing layer 22 is a light transmission structure layer and does not block light emitted from a pixel 11 and at any angle, an output amount of the light exited at an oblique angle can be increased. Thus, quality of pictures seen by a user when the user views the display module 200 with an oblique angle is improved, thereby achieving a wide viewing angle of the display module 200.

Referring to FIG. 1, the display panel 10 can include a first substrate 101 and a second substrate 102 disposed opposite to each other, and a liquid crystal layer 103 disposed between the first substrate 101 and the second substrate 102. The first substrate 101 can be a color filter (CF) substrate. The second substrate 102 can be a thin film transistor (TFT) array substrate. It can be understood that a light entry side of the display panel 10 is a side of the second substrate 102 away from the liquid crystal layer 103. The light exit side of the display panel 10 is a side of the first substrate 101 away from the liquid crystal layer 103.

Exemplarily, the refractive index of the first refraction layer 202 is 1.6-1.65 (e.g., 1.61, 1.62, 1.63, 1.64, or 1.65). The refractive index of the second refraction layer 201 is 1.3-1.4 (e.g., 1.3, 1.32, 1.34, 1.36, 1.38, or 1.4).

Exemplarily, thickness of the first refraction layer 202 is 3 μm-5 μm (e.g., 3 μm, 3.3 μm, 3.7 μm, 4 μm, 4.3 μm, 4.7 μm, or 5 μm). Thickness of the second refraction layer 201 is 90 nm-110 nm (e.g., 90 nm, 95 nm, 100 nm, 105 nm, or 110 nm).

When the refractive index of the first refraction layer 202 is 1.6-1.65, and the refractive index of the second refraction layer 201 is 1.3-1.4, by configuring a thickness range of the first refraction layer 202 to be 3 μm-5 μm and a thickness range of the second refraction layer 201 to be 90 nm-110 nm, a condition that can cause optical interference cancellation between the first refraction layer 202 and the second refraction layer 201 to occur is satisfied. Thus, reflected light is reduced.

In the embodiments of the present disclosure, a formula for calculating a reflectivity R of the reflected light-reducing layer 22 is $$R = \left(\frac{n_2 - n_1^2}{n_2 + n_1^2}\right)^2,$$

where n1 is the refractive index of the second refraction layer 201, and n2 is the refractive index of the first refraction layer 202.

Figure 4:
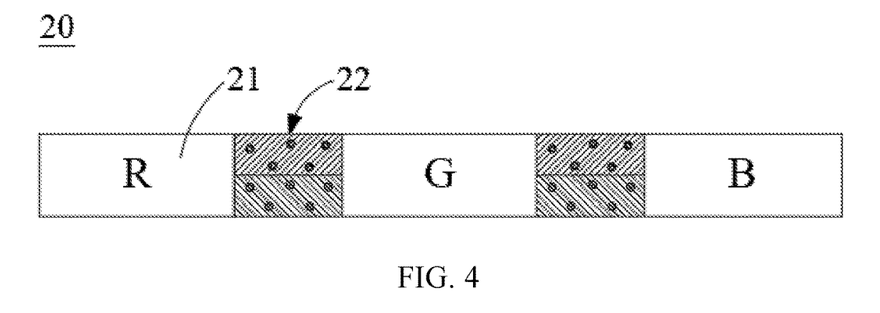
FIG. 4 is a schematic structural diagram of the first light-blocking layer provided by the embodiments of the present disclosure.
Figure 5:
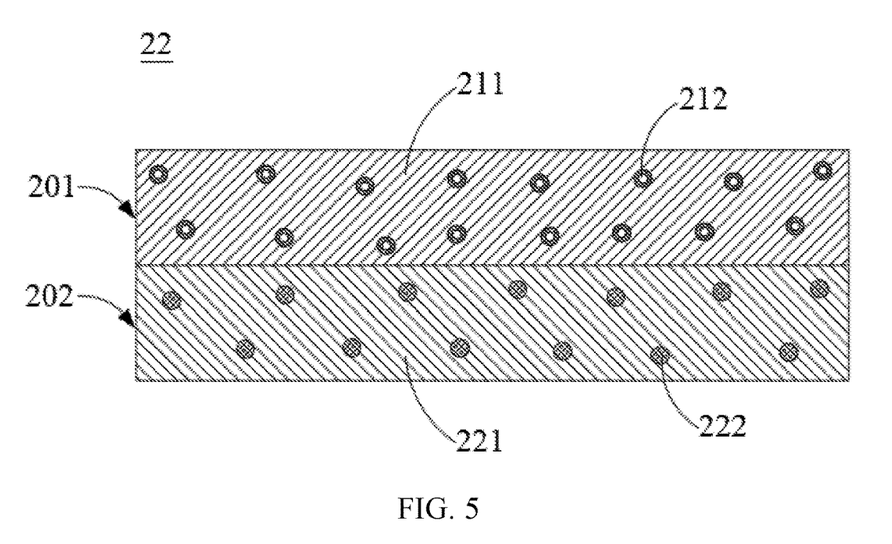
FIG. 5 is a schematic structural diagram of a reflected light-reducing layer in the first light-blocking layer in FIG. 4.

Referring to FIGS. 4 and 5, FIG. 4 is a schematic structural diagram of the first light-blocking layer provided by the embodiments of the present disclosure. FIG. 5 is a schematic structural diagram of a reflected light-reducing layer in the first light-blocking layer in FIG. 4. The second refraction layer 201 includes a first matrix 211 and first matting particles 212 dispersed in the first matrix 211. The first refraction layer 202 includes a second matrix 221 and second matting particles 222 dispersed in the second matrix 221. A refractive index of the first matting particles 212 is less than a refractive index of the second matting particles 222.

Exemplarily, the first matrix 211 can be obtained by, under ultraviolet (UV) irradiation, performing a photoinitiator-initiated cross-linking reaction on a fluorine-containing UV-curable resin and a UV-curable monomer. The fluorine-containing UV-curable resin and the UV-curable monomer can both be conventional material in the art and are not limited herein. Exemplarily, the fluorine-containing UV-curable resin can obtained by a polymerization of fluoroolefin monomers, methacrylate monomers, vinyl hydroxyethyl ethers, and vinyl monomers. The UV-curable monomer can be trimethylolpropane alkenoate (TMPTA), pentaerythritol triacrylate (PETA), dipentaerythritol hexaacrylate (DPHA), or the like. Content of the photoinitiator in the first matrix 211 can be 3 wt %-5 wt % (e.g., 3 wt %, 3.5 wt %, 4 wt %, 4.5 wt %, or 5 wt %). When the content of the photoinitiator is less than 3 wt %, incomplete curing is easily caused. When the content of the photoinitiator is greater than 5 wt %, anti-aging ability of the first matrix 211 is likely to be reduced, and a yellowing phenomenon occurs easily.

Exemplarily, the second matrix 221 can be obtained by, under UV irradiation, performing a photoinitiator-initiated cross-linking reaction on a UV-curable resin and a UV-curable monomer. Exemplarily, the UV-curable resin can be urethane acrylate oligomer, epoxy acrylate oligomer, or the like. The UV-curable monomer can be trimethylolpropane alkenoate (TMPTA), pentaerythritol triacrylate (PETA), dipentaerythritol hexaacrylate (DPHA), or the like. Content of the photoinitiator in the second matrix 221 can be 3 wt %-5 wt % (e.g., 3 wt %, 3.5 wt %, 4 wt %, 4.5 wt %, or 5 wt %). When the content of the photoinitiator is less than 3 wt %, incomplete curing is easily caused. When the content of the photoinitiator is greater than 5 wt %, anti-aging ability of the second matrix 221 is likely to be reduced, and a yellowing phenomenon occurs easily.

Exemplarily, the first matting particles 212 include one or both of the following: silica sol particles and silica particles. Each silica sol particle has particle size of 10 nm-60 nm (e.g., 10 nm, 20 nm, 30 nm, 40 nm, 50 nm, or 60 nm). Each silica particle has particle size of 40 nm-70 nm (e.g., 40 nm, 50 nm, 60 nm, or 70 nm).

Regarding the silica sol particles, it should be noted that the silica sol particles can include silica sol particles each of which has particle size of 10 nm-15 nm (e.g., 10 nm, 11 nm, 12 nm, 13 nm, 14 nm, or 15 nm) and silica sol particles each of which has particle size of 40 nm-60 nm (e.g., 40 nm, 43 nm, 47 nm, 50 nm, 53 nm, 57 nm, or 60 nm). When the silica sol particles having these two kinds of particle size are used in a mixed manner, a large number of tiny bubbles can be generated in the second refraction layer 201. Because a refractive index of air in the bubbles is less than a refractive index of the first matrix 211, the refractive index of the second refraction layer 201 can be further decreased. Thus, the first light-blocking layer 20 can achieve a better anti-reflection effect.

Exemplarily, when the silica sol particles each of which has the particle size of 10 nm-15 nm and the silica sol particles each of which has the particle size of 40 nm-60 nm are used in a mixed manner, a mass ratio between the silica sol particles each of which has the particle size of 10 nm-15 nm and the silica sol particles each of which has the particle size of 40 nm-60 nm can be (1-5):(1-5) (e.g., 1:5, 1:4, 1:3, 1:2, 1:1, 5:1, 4:1, 3:1, or 2:1).

Regarding the particle size of each silica particle, it should be noted that when the particle size of each silica particle is less than 40 nm, the second refraction layer 201 including the silica particles has poorer mechanical properties and lower hardness. When the particle size of each silica particle is larger than 70 nm, scattering ability of the silica particles is stronger. Thus, haze of the second refraction layer 201 including the silica particles is increased, a whitening phenomenon occurs, and picture quality is affected.

Exemplarily, a refractive index of the silica sol particles is 1.42-1.46 (e.g., 1.42, 1.43, 1.44, 1.45, or 1.46). A refractive index of the silica particles is 1.17-1.3 (e.g., 1.17, 1.2, 1.23, 1.25, 1.27, or 1.3).

Figure 6:
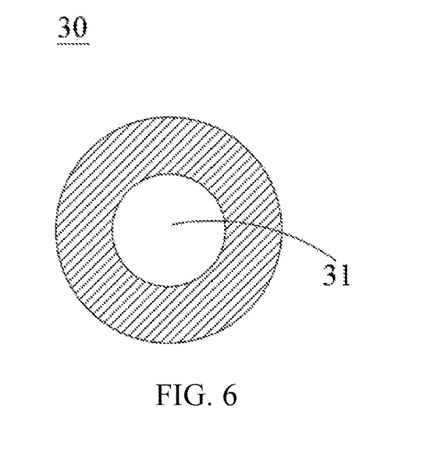
FIG. 6 is a schematic structural diagram of a hollow silica particle provided by the embodiments of the present disclosure.

Referring to FIG. 6, FIG. 6 is a schematic structural diagram of a hollow silica particle provided by the embodiments of the present disclosure. The silica particles include hollow silica particles 30. Each hollow silica particle 30 has a hollow structure 31 inside itself. Volume of the hollow structure 31 accounts for 30%-60% (e.g., 30%, 35%, 40%, 45%, 50%, 55%, or 60%) of total volume of each hollow silica particle 30.

It should be noted that a refractive index of the hollow silica particles 30 is less than a refractive index of ordinary solid silica particles. Thus, the refractive index of the second refraction layer 201 can be further decreased, so that the first light-blocking layer 20 can achieve a better anti-reflection effect.

Exemplarily, a manufacturing method of the hollow silica particles 30 can be a spray drying method, a template synthesis method, or the like.

Regarding hollowness of each hollow silica particle 30 (i.e., a percentage of how much the volume of the hollow structure 31 accounts for in the total volume of each silica particle 30), the following should be noted. When the hollowness is less than 30%, the refractive index of the hollow silica particles 30 is too high. When the hollowness is greater than 60%, corresponding walls of the hollow silica particles 30 are too thin. Thus, the second refraction layer 201 including the hollow silica particles 30 has reduced mechanical properties and decreased hardness.

Exemplarily, each hollow silica particle 30 has an outer diameter of 40 nm-70 nm (e.g., 40 nm, 50 nm, 60 nm, or 70 nm), and an inner diameter of 2 nm-40 nm (e.g., 2 nm, 5 nm, 10 nm, 20 nm, 30 nm, or 40 nm).

Exemplarily, the silica particles can further include one or both of the following: ordinary solid silica particles and mesoporous silica particles. Mesoporous silica particles refer to silica particles with pits on the corresponding surfaces.

Exemplarily, the second matting particles 222 include metal oxide particles. Each metal oxide particle has particle size of 10 nm-50 nm (e.g., 10 nm, 20 nm, 30 nm, 40 nm, or 50 nm)

Exemplarily, a refractive index of metal oxide particles is 1.9-2.3 (e.g., 1.9, 2.0, 2.1, 2.2, or 2.3).

Exemplarily, material of the metal oxide particles includes one or more of the following light-transmissive metal oxides: zinc oxide, titanium oxide, tin oxide, and indium tin oxide.

Figure 7:
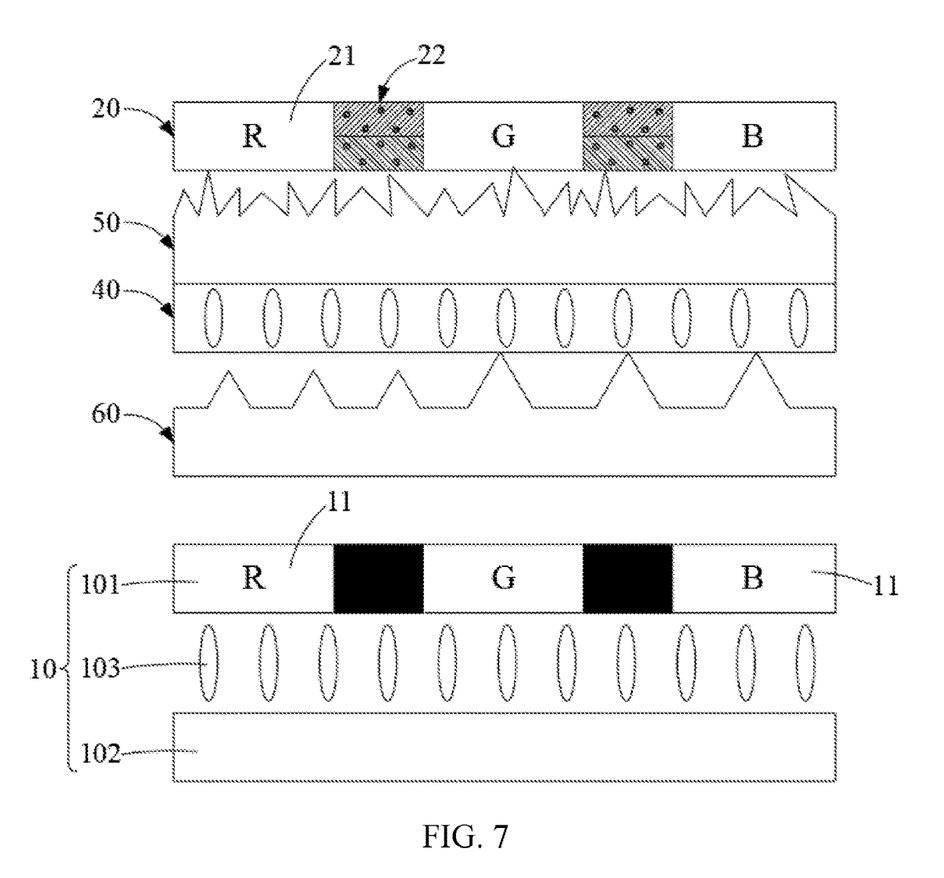
FIG. 7 is a schematic structural diagram of a second type of display module provided by embodiments of the present disclosure.

Referring to FIG. 7, FIG. 7 is a schematic structural diagram of a second type of display module provided by embodiments of the present disclosure. Compared with FIG. 1, FIG. 7 has the following difference. The display module 200 further includes a second light-blocking layer 40. The second light-blocking layer 40 is disposed between the display panel 10 and the first light-blocking layer 20. The second light-blocking layer 40 includes one or both of the following: liquid crystal material and dichroic material.

It can be understood that the second light-blocking layer 40 is disposed between the display panel 10 and the first light-blocking layer 20 so that the second light-blocking layer 40 can be used to absorb a part of polarized light of ambient light incident on the display module 200. Thus, an anti-reflection effect is achieved.

Exemplarily, the dichroic material can be metal such as gold, silver, or iron, microcrystalline material such as graphite or iodine, or organic dye such as azo pigment.

In some embodiments, the second light-blocking layer 40 can further include a light transmission matrix. The liquid crystal material or the dichroic material is dispersed in the light transmission matrix. Material of the light transmission matrix can be resin material. In some other embodiments, the second light-blocking layer 40 further includes a light transmission box. The light transmission box has a hollow structure inside itself. The liquid crystal material or the dichroic material is accommodated in the hollow structure.

Exemplarily, thickness of the second light-blocking layer 40 can be 1 μm-12 μm (e.g., 1 μm, 3 μm, 5 μm, 7 μm, 10 μm, or 12 μm).

Exemplarily, when the second light-blocking layer 40 includes the liquid crystal material, an angle between a long axis of the liquid crystal material and a plane where the display panel 10 is located can be 80°-90°. When the second light-blocking layer 40 includes the dichroic material, an angle between a long axis of the dichroic material and the plane where the display panel 10 is located can be 80°-90°. It can be understood that when ambient light of which incident direction forms an included angle of certain degrees (greater than 0° and less than or equal to 90°) with the long axis of the liquid crystal material or the dichroic material is incident on the second light-blocking layer 40, a part of polarized light of incident light is absorbed by the liquid crystal material or the dichroic material, resulting in weakening of light intensity of the incident light. And when reflected light enters the liquid crystal material or the dichroic material at a certain angle with respect to the long axis of the liquid crystal material and the dichroic material and exits from the liquid crystal material or the dichroic material, a part of polarized light of the reflected light is absorbed by the liquid crystal material or the dichroic material, resulting in weakening of light intensity of the reflected light. Thus, an anti-reflection effect is achieved.

Referring to FIG. 7, the display module 200 can further include a roughened layer 50. The roughened layer 50 is disposed between the second light-blocking layer 40 and the first light-blocking layer 20. A surface of the roughened layer 50 on a side of the roughened layer 50 facing the first light-blocking layer 20 is an uneven rough surface.

It can be understood that by disposing the roughened layer 50 between the second light-blocking layer 40 and the first light-blocking layer 20, because the surface of the roughened layer 50 is the uneven rough surface, the surface of the roughened layer 50 can have a function of diffusively reflecting ambient light. By dispersing reflected light, an anti-glare effect can be achieved, and a display effect of the display module 200 under ambient light is improved.

Exemplarily, material of the roughened layer 50 can include one or more of the following: triacetate cellulose (TAC), polymethyl methacrylate (PMMA), and polyethylene terephthalate (PET).

Exemplarily, the rough surface of the roughened layer 50 can be formed by imprinting or etching.

Figure 8:
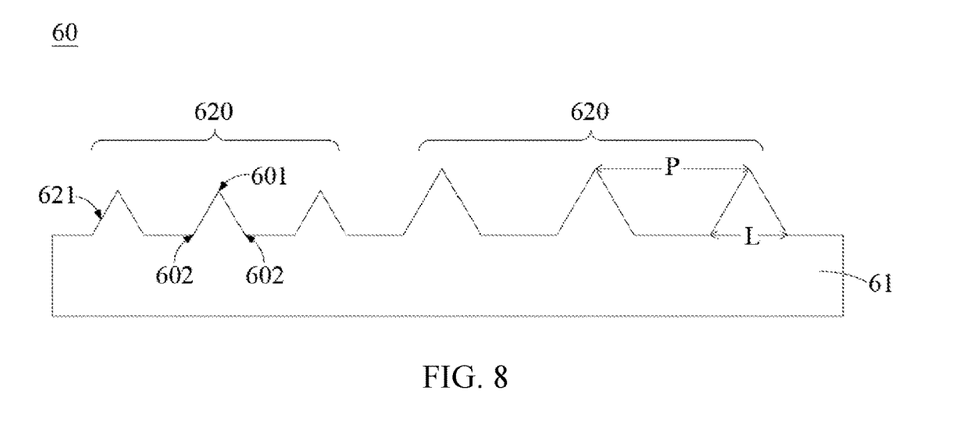
FIG. 8 is a schematic structural diagram of a diffusion layer provided by the embodiments of the present disclosure.

Referring to FIGS. 7 and 8, FIG. 8 is a schematic structural diagram of a diffusion layer provided by the embodiments of the present disclosure. The display module 200 can further include a diffusion layer 60. The diffusion layer 60 is disposed between the first light-blocking layer 20 and the display panel 10.

The diffusion layer 60 includes a substrate 61 and a prism layer sequentially stacked in the light emission direction of the display panel 10.

It can be understood that by disposing the diffusion layer 60 between the first light-blocking layer 20 and the display panel 10, light exited from the display panel 10 can be diffused, achieving an effect of enlarging a viewing angle of the display device. In addition, because the prism layer can diffusively reflect ambient light, specular reflection and a glare effect can be reduced.

Referring to FIGS. 7 and 8, in some embodiments, the diffusion layer 60 is disposed between the second light-blocking layer 40 and the display panel 10.

Referring to FIG. 8, the prism layer can include a plurality of prism bars 621 arranged at intervals in sequence. Each prism bar has a top edge 601 and two bottom edges 602. The two bottom edges 602 are connected with the substrate 61 and the top edge 601 protrudes from the substrate 61.

Base length L of each prism bar 621 is distance between two bottom edges 602 of each prism bar 621. Spacing P between adjacent two of the prism bars 621 is distance between the top edges 601 of the adjacent two of the prism bars 621, respectively.

Every at least one prism bar 621 arranged in sequence is taken as a prism group 620. The base length L of each prism bar 621 included in each prism group 620 is same. The spacing P between any adjacent two of the prism bars 621 in each prism group 620 is same. L/P values of any adjacent two of the prism groups 620 are different.

It should be noted that in a traditional diffusion layer 60, base length L of all of prism bars 621 is same. Spacing P between any adjacent two of the prism bars 621 is same. That is, the prism bars 621 are evenly spaced apart. Although this type of prism sheet can achieve a light diffusion effect, because the prism bars 621 are arranged regularly, an optical interference phenomenon occurs easily. Thus, a displayed picture of the display device that uses the diffusion layer 60 exhibits a moiré pattern, thereby decreasing quality of the displayed picture. In the embodiments of the present disclosure, L/P values of any adjacent two of the prism groups 620 are set to be different. That is, the prism bars 621 are arranged irregularly. Thus, an optical interference phenomenon can be reduced or eliminated, thereby avoiding exhibition of a moiré pattern by a displayed picture of the display device that uses the diffusion layer 60, and increasing quality of the displayed picture of the display device.

In some embodiments, L/P values respectively of all of the prism groups 620 in the prism layer are different. Thus, the prism bars 621 are arranged irregularly to the greatest extent, the moiré pattern is eliminated to the greatest extent, and the quality of the display picture is improved.

Exemplarily, the plurality of prism bars 621 can be parallel to each other.

In the embodiments of the present disclosure, "at least one" can be one, two, or more than two such as three, four, five, six, seven, or eight. "A plurality of" can be two or more than two such as three, four, five, six, seven, or eight.

Referring to FIG. 8, the inventors of the present disclosure have found through a large number of experiments that when every three of the prism bars 621 arranged in sequence are taken as a prism group 620 and an L/P value of any one of the prism group 620 and an L/P value of its adjacent one of the prism group 620 are set to be different, the best technical effect can be achieved in terms of reducing the moiré pattern, thereby increasing the quality of the displayed picture of the display device to the greatest extent.

Exemplarily, L values respectively of adjacent prism groups 620 are set to be different, P values respectively of adjacent prism groups 620 are set to be different, or both of L values respectively of adjacent prism groups 620 and P values respectively of adjacent prism groups 620 are set to be different, so that L/P values respectively of the adjacent prism groups 620 are different.

Referring to FIG. 8, a longitudinal cross section of each prism bar 621 can be an isosceles triangle. The longitudinal cross section refers to a cross section in a direction from the display panel 10 to the first light-blocking layer 20. At this time, the base length L of each prism bar 621 is a base L of the triangle.

Figure 9:
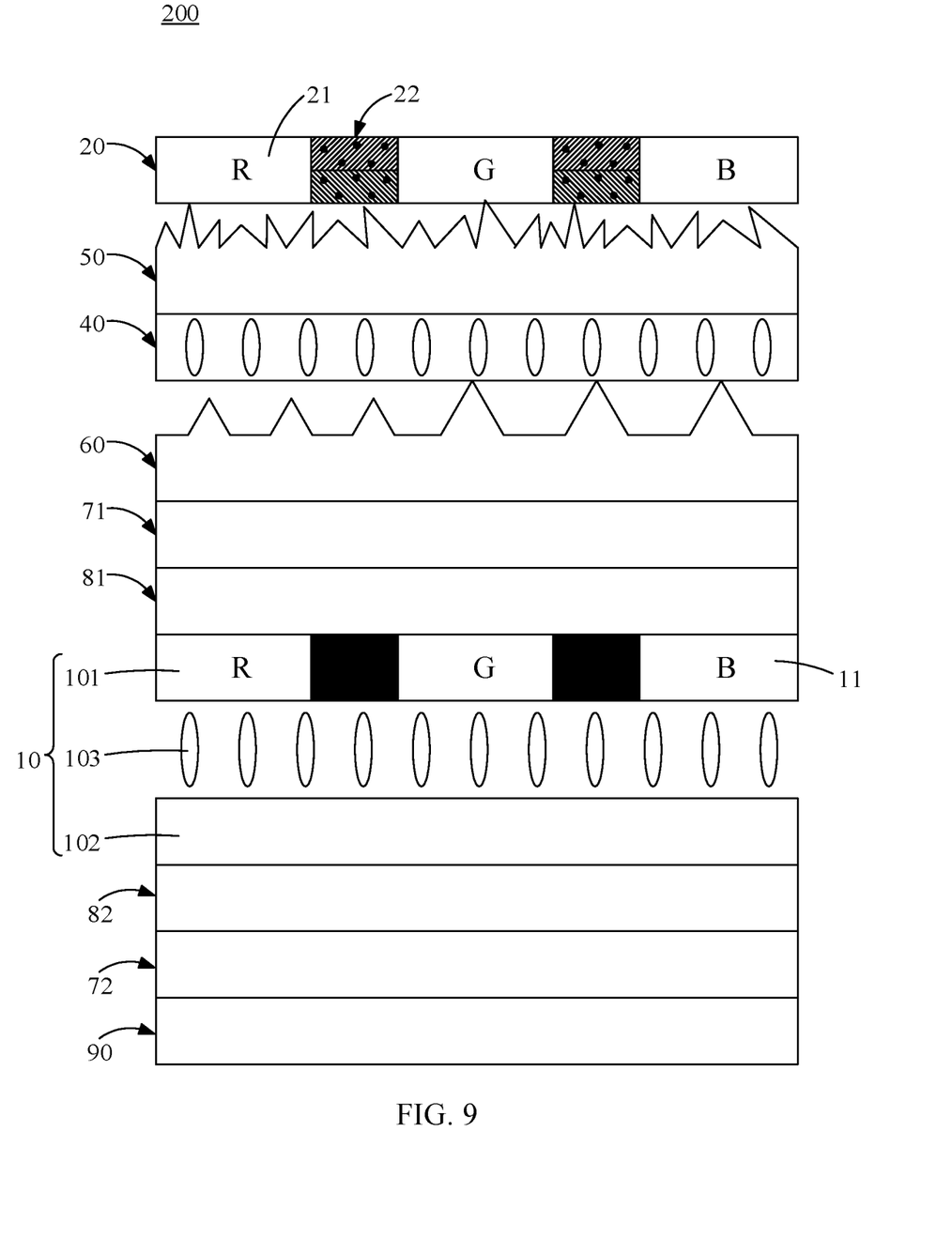
FIG. 9 is a schematic structural diagram of a third type of display module provided by embodiments of the present disclosure.

Referring to FIG. 9, FIG. 9 is a schematic structural diagram of a third type of display module provided by embodiments of the present disclosure. In the embodiments, the display panel 10 is a liquid crystal display panel. At this time, the display module 200 can further include a first polarizer film 71, a first compensation film 81, a second polarizer film 72, a second compensation film 82, and a protective layer 90. The first polarizer film 71 is disposed before the diffusion layer 60 and the display panel 10. The first compensation film 81 is disposed between the first polarizer film 71 and the display panel 10. The second polarizer film 72 is disposed on a light entry side of the display panel 10. The second compensation film 82 is disposed between the second polarizer film 72 and the display panel 10.

It can be understood that a compensation principle of the first compensation film 81 and the second compensation film 82 is as follows. A phase difference generated by a liquid crystal under different viewing angles is corrected, so that birefringence performance of liquid crystal molecules is symmetrically compensated. Thus, light leakage of dark-state pictures can be effectively reduced, and a contrast ratio of the pictures can be greatly improved within a certain viewing angle. A function of the protective layer 90 is to protect a side of the second polarizer film 72 away from the display panel 10.

Exemplarily, material of the first polarizer film 71 and material of the second polarizer film 72 can both include polyvinyl alcohol (PVA).

Exemplarily, the first light-blocking layer 20, the second light-blocking layer 40, the roughened layer 50, the diffusion layer 60 can all be separately formed films, or can be formed layer by layer on the display panel 10.

It can be understood that the first light-blocking layer 20, the second light-blocking layer 40, the roughened layer 50, and the diffusion layer 60 disposed on a side of the first polarizer film 71 away from the display panel 10 can also have a function of protecting the first polarizer film 71.

Figure 10:
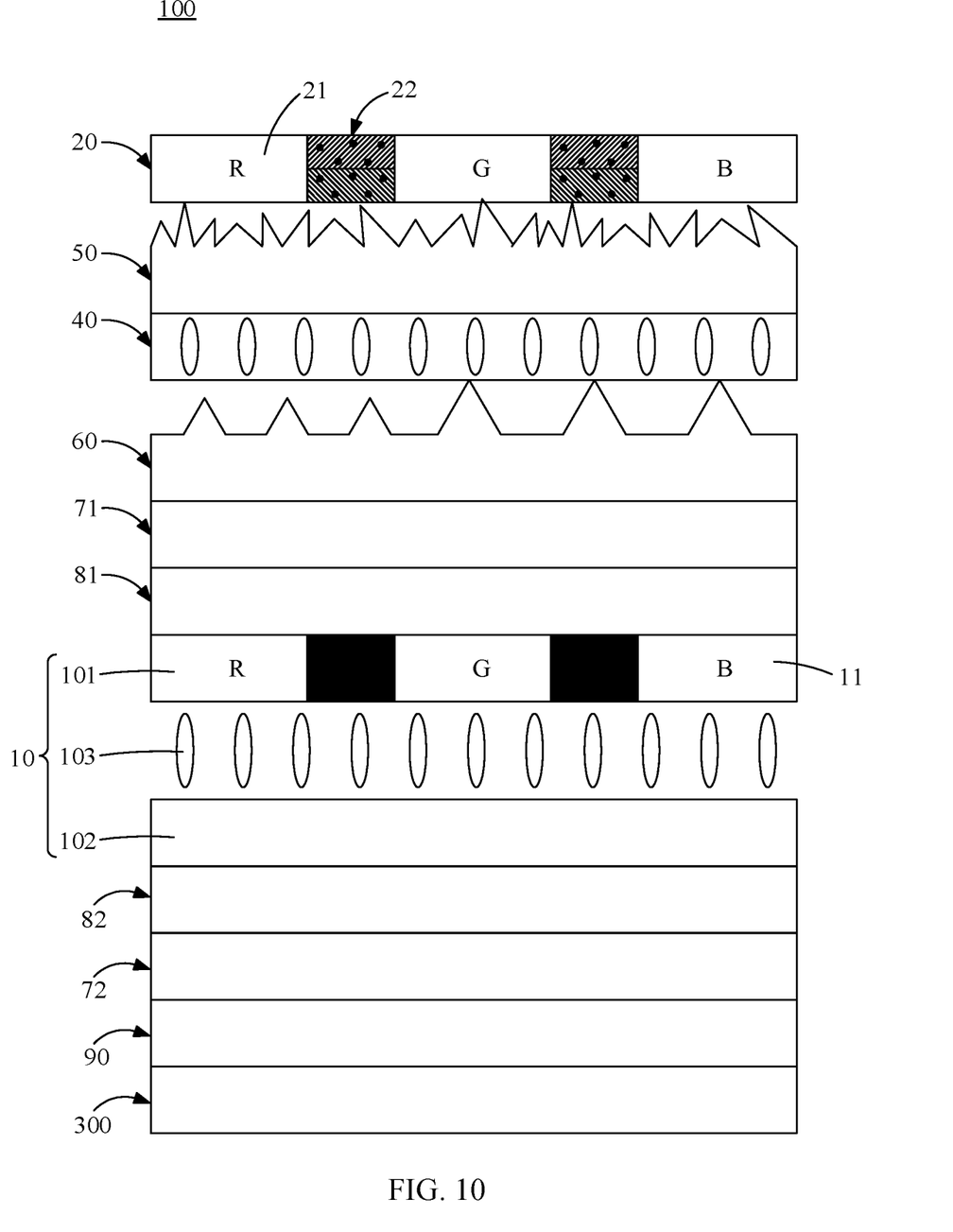
FIG. 10 is a schematic structural diagram of a liquid crystal display device provided by embodiments of the present disclosure.

Referring to FIG. 10, FIG. 10 is a schematic structural diagram of a liquid crystal display device provided by embodiments of the present disclosure. The embodiments of the present disclosure also provides a liquid crystal display device 100 which includes a display module 200 and a backlight module 300. The display panel 10 is a liquid crystal display panel. The backlight module 300 is disposed on a light entry side of the display panel 10. The display module 200 can be the display module 200 in any one of the aforementioned embodiments.

Exemplarily, the liquid crystal display device 100 can be display device such as a television, a mobile phone, a tablet computer, a computer monitor, or an advertisement display.

The display modules provided by embodiments of the present disclosure have been described in detail above. The principles and implementation manners of the present disclosure are described herein using specific examples. The description of the foregoing embodiments is only for facilitating understanding of the present disclosure. At the same time, for those skilled in the art, changes in specific embodiments and application scope can be made on the basis of the idea of the present disclosure. In summary, content of the present specification should not be construed as a limitation to the present disclosure.

What is claimed is:

1. A display module, comprising:
    a display panel comprising a plurality of pixels disposed at intervals; and
    a first light-blocking layer disposed on a light exit side of the display panel, wherein the first light-blocking layer comprises a plurality of light-filtering units disposed at intervals and reflected light-reducing layers each of which disposed between the corresponding light-filtering units which are adjacent to each other, wherein the light-filtering units are respectively disposed corresponding to the plurality of pixels, wherein each reflected light-reducing layer comprises a first refraction layer and a second refraction layer that are arranged in a stacking manner, and wherein a refractive index of the first refraction layer is not equal to a refractive index of the second refraction layer;
    wherein the display module further comprises a diffusion layer, the diffusion layer is disposed between the first light-blocking layer and the display panel, and the diffusion layer comprises a substrate and a prism layer sequentially stacked in the light emission direction of the display panel;
    the prism layer comprises a plurality of prism bars arranged at intervals in sequence, each prism bar has a top edge and two bottom edges, and the two bottom edges are connected with the substrate and the top edge protrudes from the substrate;
    wherein base length L of each prism bar is distance between two bottom edges of each prism bar, and spacing P between adjacent two of the prism bars is distance between the top edges of the adjacent two of the prism bars, respectively; and
    wherein every at least one prism bar arranged in sequence is taken as a prism group, the base length L of each prism bar comprised in each prism group is same, the spacing P between any adjacent two of the prism bars in each prism group is same, and L/P values of any adjacent two of the prism groups are different.

2. The display module of claim 1, wherein the first refraction layer and the second refraction layer are sequentially stacked in a light emission direction of the display panel, and wherein the refractive index of the first refraction layer is greater than the refractive index of the second refraction layer.

3. The display module of claim 2, wherein the refractive index of the first refraction layer is 1.6-1.65, and the refractive index of the second refraction layer is 1.3-1.4.

4. The display module of claim 3, wherein thickness of the first refraction layer is 3 μm-5 μm and thickness of the second refraction layer is 90 nm-110 nm.

5. The display module of claim 1, wherein the second refraction layer comprises a first matrix and first matting particles dispersed in the first matrix, wherein the first refraction layer comprises a second matrix and second matting particles dispersed in the second matrix, and wherein a refractive index of the first matting particles is less than a refractive index of the second matting particles.

6. The display module of claim 5, wherein the first matting particles comprise one or both of the following: silica sol particles and silica particles.

7. The display module of claim 6, wherein each silica sol particle has particle size of 10 nm-60 nm.

8. The display module of claim 7, wherein the first matrix and first matting particles comprise silica sol particles each of which has the particle size of 10 nm-15 nm and silica sol particles each of which has the particle size of 40 nm-60 nm, and a mass ratio between the silica sol particles each of which has the particle size of 10 nm-15 nm and the silica sol particles each of which has the particle size of 40 nm-60 nm can be (1-5):(1-5).

9. The display module of claim 6, wherein each silica particle has particle size of 40 nm-70 nm.

10. The display module of claim 6, wherein the silica particles comprise hollow silica particles, and wherein each hollow silica particle has a hollow structure inside itself.

11. The display module of claim 10, wherein volume of the hollow structure accounts for 30%-60% of total volume of each hollow silica particle.

12. The display module of claim 10, wherein the silica particles further comprise one or both of ordinary solid silica particles and mesoporous silica particles, the mesoporous silica particles refer to silica particles with pits on the corresponding surfaces, and a refractive index of the hollow silica particles is less than a refractive index of ordinary solid silica particles.

13. The display module of claim 5, wherein the second matting particles comprise metal oxide particles.

14. The display module of claim 13, wherein each metal oxide particle has particle size of 10 nm-50 nm.

15. The display module of claim 13, wherein a refractive index of metal oxide particles is 1.9-2.3.

16. The display module of claim 15, wherein material of the metal oxide particles comprises one or more of the following: zinc oxide, titanium oxide, tin oxide, and indium tin oxide.

17. The display module of claim 1, wherein the display module further comprises a second light-blocking layer, wherein the second light-blocking layer is disposed between the display panel and the first light-blocking layer, and wherein the second light-blocking layer comprises one or both of the following: liquid crystal material and dichroic material.

18. The display module of claim 17, wherein the display module further comprises a roughened layer, wherein the roughened layer is disposed between the second light-blocking layer and the first light-blocking layer, and wherein a surface of the roughened layer on a side of the roughened layer facing the first light-blocking layer is an uneven structure.

19. The display module of claim 1, wherein L/P values respectively of all of the prism groups in the prism layer are different.

20. The display module of claim 1, wherein a color of the light passing through each light-filtering unit is consistent with a color of a correspondingly disposed pixel.

* * * * *